United States Patent
Dudar et al.

(10) Patent No.: US 10,197,412 B2
(45) Date of Patent: Feb. 5, 2019

(54) ELECTRIC VEHICLE CHARGING

(71) Applicant: Ford Global Technologies, LLC, Dearborn, MI (US)

(72) Inventors: Aed M. Dudar, Canton, MI (US); Douglas Raymond Martin, Canton, MI (US); Kenneth James Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/470,981

(22) Filed: Mar. 28, 2017

(65) Prior Publication Data
US 2018/0283887 A1    Oct. 4, 2018

(51) Int. Cl.
*G01C 21/34* (2006.01)
*B60L 11/18* (2006.01)

(52) U.S. Cl.
CPC ...... *G01C 21/3469* (2013.01); *B60L 11/1861* (2013.01); *B60L 2240/665* (2013.01)

(58) Field of Classification Search
CPC ............ G01C 21/3469; B60L 11/1861; B60L 2240/665
See application file for complete search history.

(56) References Cited

U.S. PATENT DOCUMENTS

| | | | | |
|---|---|---|---|---|
| 6,116,368 A * | 9/2000 | Lyons | ...... | B60K 6/46 180/165 |
| 7,402,978 B2 * | 7/2008 | Pryor | ...... | B60L 11/1816 320/104 |
| 7,597,388 B1 * | 10/2009 | Samuel | ...... | B60R 11/02 296/210 |
| 9,853,488 B2 * | 12/2017 | Fincham | ...... | H02J 7/1446 |
| 9,904,288 B2 * | 2/2018 | Mattila | ...... | G05D 1/0217 |
| 2009/0313174 A1 * | 12/2009 | Hafner | ...... | G06Q 30/02 705/80 |
| 2010/0017249 A1 * | 1/2010 | Fincham | ...... | B60L 3/12 705/412 |
| 2010/0193261 A1 | 8/2010 | Freeman | | |
| 2011/0079166 A1 | 4/2011 | Popa-Simil | | |
| 2011/0191266 A1 * | 8/2011 | Matsuyama | ...... | G06Q 50/06 705/412 |
| 2013/0110330 A1 * | 5/2013 | Atluri | ...... | B60L 1/003 701/22 |
| 2013/0285841 A1 * | 10/2013 | Kirsch | ...... | G08G 1/143 340/932.2 |

(Continued)

FOREIGN PATENT DOCUMENTS

| CN | 102420441 A | 4/2012 |
|---|---|---|
| CN | 103812144 A | 5/2014 |

(Continued)

OTHER PUBLICATIONS

GB Search Report dated Sep. 24, 2018 re GB Appl. No. 1804684.7.

*Primary Examiner* — Tyler J Lee
(74) *Attorney, Agent, or Firm* — Frank A. MacKenzie; Bejin Bieneman PLC

(57) ABSTRACT

A vehicle charge system includes a computer programmed to navigate a vehicle to a charge location based on a determination, upon determining that light received by the vehicle is below a light threshold, that one of a current vehicle charge level and a predicted charge level is below a charge threshold.

19 Claims, 2 Drawing Sheets

(56) References Cited

U.S. PATENT DOCUMENTS

| | | | |
|---|---|---|---|
| 2014/0136414 A1* | 5/2014 | Abhyanker | G06Q 50/28 |
| | | | 705/44 |
| 2015/0202770 A1* | 7/2015 | Patron | G05D 1/024 |
| | | | 700/245 |
| 2016/0021178 A1* | 1/2016 | Liu | H04W 76/10 |
| | | | 370/216 |
| 2017/0045888 A1* | 2/2017 | Mattila | B60L 8/003 |
| 2017/0244270 A1* | 8/2017 | Waters | B60L 11/1829 |
| 2018/0136663 A1* | 5/2018 | Mattila | B60L 11/1833 |

FOREIGN PATENT DOCUMENTS

| | | |
|---|---|---|
| JP | 2009207327 A | 9/2009 |
| JP | 201351194 A | 3/2013 |
| KR | 101267007 B1 | 5/2013 |
| WO | 2011010392 A1 | 1/2011 |

* cited by examiner

ELECTRIC VEHICLE CHARGING

BACKGROUND

Electric vehicles are becoming more widespread. Such vehicles typically charge by being plugged into a utility power grid, or may be charged using available public resources, e.g. charging via photovoltaic cells using available light. However, such resources can be unavailable and/or less efficient in various locations at various times.

DETAILED DESCRIPTION

Introduction

Figure 1:
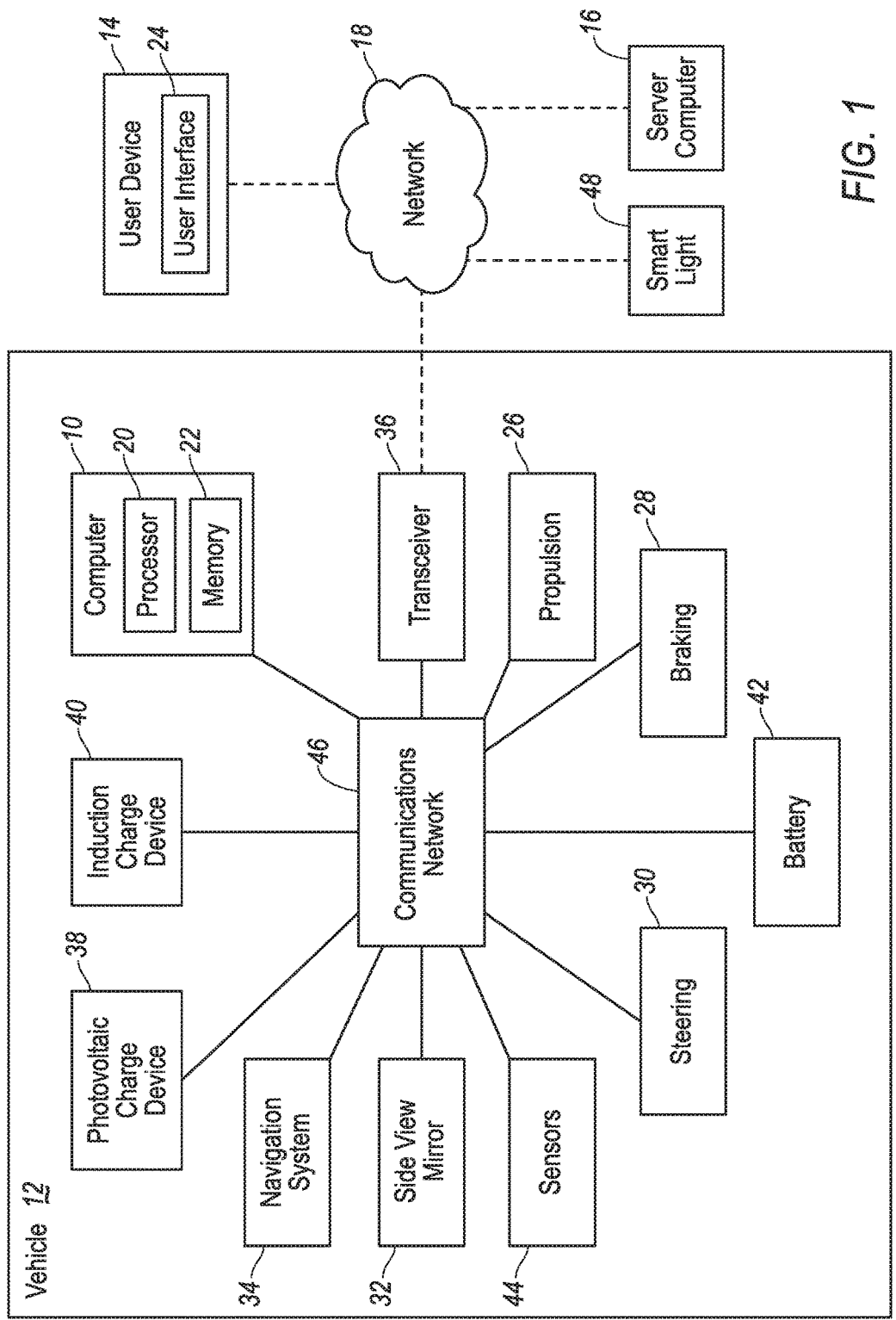
FIG. 1 is a block diagram of components of an example vehicle charging system.

Disclosed herein is a method comprising navigating a vehicle to a charge location based on a determination, upon determining that light received by the vehicle is below a light threshold, that one of a current vehicle charge level and a predicted charge level is below a charge threshold. The charge location may be one of a photovoltaic charge location and an induction charge location. The charge location may be the photovoltaic charge location when the predicted or current charge level is above a second threshold. The charge location may be the induction photovoltaic charge location when the predicted or current charge level is below a second threshold. The light received by the vehicle may be identified as being below the light threshold when the current time is after sunset.

The method may further comprise navigating the vehicle away from a photovoltaic charge location upon a determination that a cost of remaining at the photovoltaic charge location is greater than a benefit of remaining at the photovoltaic charge location.

The method may further comprise determining the photovoltaic charge location based on a photovoltaic charge location database.

The method may further comprise determining the photovoltaic charge location based on a time at which the vehicle is intended to be operate.

The method may further comprise determining the photovoltaic charge location based on information received from a light sensor.

The method nay further comprise determining the photovoltaic charge based on information received from a smart light.

The method may further comprise determining the predicted charge level based on the current charge level, a predicted charge rate, and an amount of time until sunset.

The method may further comprise actuating the vehicle to provide a movement that can be sensed by a motion actuated light in response to determining the motion actuated light has turned off. The movement may be provided by actuating a side view mirror.

The method may further comprise navigating the vehicle to a home location in response to determining the current charge level is above another threshold.

Also disclosed herein is a computer having a processor and memory programmed to perform some or all of the disclosed method. Also disclosed is a computer-readable medium storing computer-executable instructions to perform some or all of the disclosed method.

Also disclosed herein is a system comprising a computer programmed to navigate a vehicle to a charge location based on a determination, upon determining that light received by the vehicle is below a light threshold, that one of a current vehicle charge level and a predicted charge level is below a charge threshold. The charge location may be one of a photovoltaic charge location and an induction charge location. The charge location may be the photovoltaic charge location when the predicted or current charge level is above a second charge threshold. The light received by the vehicle may be identified as being below the light threshold when the current time is after sunset.

The computer may be further programmed to navigate the vehicle away from a photovoltaic charge location upon a determination that a cost of remaining at the photovoltaic charge location is greater than a benefit of remaining at the photovoltaic charge location.

The computer may be further programmed to determine the photovoltaic charge location based on a time at which the vehicle is intended to be operated.

The computer may be further programmed to determine the photovoltaic charge location based on information received from a light sensor.

The computer may be further programmed to determine the predicted charge level based on the current charge level, a predicted charge rate, and an amount of time until sunset.

The computer may be further programmed to determine the photovoltaic charge location based on information received from a smart light.

The computer may be further programmed to actuate the vehicle to provide a movement that can be sensed by a motion-actuated light in response to determining the motion-actuated light has turned off.

With reference to FIG. 1, a computer 10 in a vehicle 12 is programmed to navigate the vehicle 12 to a charge location based on a determination, upon determining that light received by the vehicle 12 is below a light threshold, that one of a current vehicle charge level and a predicted charge level is below a charge threshold.

The programming of the computer 10 solves a problem in charging the vehicle 12 in situations where current solutions do not provide a technical architecture for charging the vehicle, namely, how to provide light to charge the vehicle 12 when light received by the vehicle 12 is below a light threshold, e.g., after the sun has set.

The vehicle 12 may communicate with a user device 14 and/or a server computer 16, e.g., a "cloud" server, via a network 18.

The network 18, which is implemented via circuits, chips, or other electronic components, facilitates wired or wireless communication between or among multiple system components. In some instances, the network 18 facilitates both wired and wireless communication. Examples of wired communication includes communication over cable, fiber, or the like. Examples of wired communication protocols include Ethernet, etc. Wireless communication may be implemented via cell towers, satellites, antennas, or the like. Examples of wireless communication protocols include Bluetooth®, IEEE 802.11 (colloquially referred to as WiFi), satellite telecommunication protocols, and cellular protocols such as 3G, LTE, etc.

The server computer 16 is a computing device that includes hardware, e.g. circuits, chips, antennas, Ethernet ports, etc., and that is programmed to transmit, receive, and process information, to and from the vehicle 12, the user device 14, and other computing devices, e.g., via the network 18. The server computer 16 includes a processor and a memory implemented in a manner as described below for a processor 20 and a memory 22. The server computer 16 may be programmed to perform processes, methods, and other computation and storage operations including as discussed herein. The server computer 16 may use any suitable technologies, including those discussed herein.

The user device 14 may be any one of a variety of computing devices implemented as described above for the server computer 16, e.g., a smartphone, a tablet, a personal digital assistant, etc., the user device 14 may communicate with the vehicle 12 and the server computer 16, e.g., directly or via the network 18. The user device 14 may include a user interface 24. The user interface 24 presents information to and receives information from a user of the user device 14, e.g., a touch-sensitive display screen, a keyboard, a microphone, a speaker, etc.

The Vehicle

The vehicle 12 may include any autonomous passenger or commercial automobile such as a sedan, a station wagon, a sport utility vehicle, a crossover vehicle, a van, a minivan, a taxi, a bus, etc. The computer 10, sometimes referred to as the vehicle controller, may be capable of operating the vehicle 12 independently of the intervention of a human driver, completely or to a greater or a lesser degree. The computer 10 may be programmed to operate a propulsion 26, a braking 28, a steering 30, and/or other vehicle systems.

For purposes of this disclosure, an autonomous mode is defined as one in which each of the propulsion 26, the braking 28, and the steering 30 of the vehicle 12 are controlled by one or more computers; in a semi-autonomous mode computer(s) of the vehicle 12 control(s) one or two of vehicle the propulsion 26, the braking 28, and the steering 30.

In addition to the propulsion 26, braking 28, and steering 30, the vehicle 12 may include a side view mirror 32, a navigation system 34, a transceiver 36, a photovoltaic charge device 38, an induction charge device 40, a battery 42, sensors 44, and the computer 10, all in communication with each other via a communication network 46.

The vehicle 12 communication network 46 includes hardware, such as a communication bus, for facilitating communication among vehicle components. The communication network 46 may facilitate wired or wireless communication among the vehicle components in accordance with a number of communication protocols such as controller area network (CAN), Ethernet, WiFi, Local Interconnect Network (LIN), and/or other wired or wireless mechanisms.

The propulsion 26 of the vehicle translates stored energy into motion of the vehicle 12. The propulsion 26 may be a known vehicle propulsion subsystem, for example, an electric powertrain including batteries 42, an electric motor, and a transmission that transfers rotational motion to the wheels; a hybrid powertrain including elements of the electric powertrain and elements of a conventional powertrain, e.g., an internal-combustion engine coupled to a transmission that transfers rotational motion to wheels; or any other type of propulsion requiring storage of electricity. The propulsion 26 is in communication with and receives input from the computer 10 and/or from a human driver. The human driver may control the propulsion 26 via, e.g., an accelerator pedal and/or a gear-shift lever.

The braking 28 is typically a known vehicle braking subsystem and resists the motion of the vehicle 12 to thereby slow and/or stop the vehicle 12. The braking 28 may be friction brakes such as disc brakes, drum brakes, band brakes, and so on; regenerative brakes; any other suitable type of brakes; or a combination. The braking 28 is in communication with and receives input from the computer 10 and/or a human driver. The human driver may control the braking 28 via, e.g., a brake pedal.

The steering 30 is typically a known vehicle steering subsystem and controls the turning of the wheels. The steering 30 is in communication with and receives input from a steering wheel and/or the computer 10. The steering 30 may be a rack-and-pinion system with electric power-assisted steering, a steer-by-wire system, as are both known in the art, or any other suitable system.

The side view mirror 32 is pivotally mounted on the vehicle 12 and includes electromechanical components, e.g., a linear actuator, servo motor, etc., to actuate the side view mirror 18 between an extended and retracted state, e.g., upon receipt of a command from the computer 10.

The navigation system 34 is implemented via circuits, chips, or other electronic components that can determine a present location of the vehicle 12. The navigation system 34 may be implemented via satellite-based system such as the Global Positioning System (GPS). The navigation system 34 may triangulate the location of the vehicle 12 based on signals received from various satellites in the Earth's orbit. The navigation system 34 is programmed to output signals representing the present location of the vehicle 12 to, e.g., the computer 10 via the communication network 46. In some instances, the navigation system 34 is programmed to determine a route from the present location to a future location, including developing alternative routes, e.g., if a road is flooded. The navigation system 34 may access a virtual map stored locally in the navigation system 34, stored in the computer 10 memory 22 (discussed below), and/or in the server computer 16, and develop the route according to the virtual map data.

The transceiver 36 transmits and receives information wirelessly from other transceivers, enabling signals, data and other information to be exchanged with other computer and network systems. The transceiver 36 is implemented via antennas, circuits, chips, or other electronic components that can facilitate wireless communication. Example transceivers 36 include Wi-Fi systems, radio transmitters and receivers, telecommunications systems, Bluetooth® systems, cellular systems and mobile satellite transceivers. The transceiver 36 may communicate with other vehicles and devices, e.g., the user device 14, the server computer 16, a smart light 48 (discussed below), etc., directly, such as via RF communications, and/or indirectly, such as via the network 18.

The photovoltaic charge device 38 converts light into electricity. The photovoltaic charge device 38 may include one or more photovoltaic cells wired in parallel and/or in series to provide desired electric output characteristics, such as a certain target output, e.g., 110 volts.

The induction charge device 40 wirelessly receives energy, e.g., in the form of an alternating magnetic field, and converts the energy to electricity. The induction charge device 40 may include an induction coil (such as is known and therefore not shown in the drawings).

The induction charge device 40 and the photovoltaic charge device 38 are electrically connected to various vehicle 12 components, e.g., the battery 42, such that electricity may flow from the induction charge device 40 and the photovoltaic charge device 38 to the battery 42.

The battery 42 stores electrical energy. The battery 42 may include one or more cells wired in series and/or in parallel to provide desired voltage and energy storage capacity characteristics. The battery 42 may be of any suitable type for vehicular electrification, for example, lithium-ion batteries, nickel-metal hydride batteries, lead-acid batteries, or ultracapacitors, as used in, for example, plug-in hybrid electric vehicles (PHEVs), hybrid electric vehicles (HEVs), or battery electric vehicles (BEVs).

The sensors 44 may detect internal states of the vehicle 12, for example, wheel speed, wheel orientation, charge level of the battery 42, e.g., with a voltage sensor, and engine and transmission variables. The sensors 44 may detect the position or orientation of the vehicle 12, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 44 may detect the external world, for example, radar sensors, scanning laser range finders, light detection and ranging (LIDAR) devices, light meters, and image processing sensors such as cameras. The sensors may include communications devices, for example, vehicle-to-infrastructure (V2I) or vehicle-to-vehicle (V2V) devices.

The computer 10 is a computing device that includes the processor 20 and the memory 22. The computer 10 is in electronic communication with, e.g., via the communication network 46, one or more input devices for providing data to the computer 10 and one or more output devices that can receive data and/or instructions from the computer 10, e.g., to actuate the output device. Example input devices include: the navigation system 34, the transceiver 36, the photovoltaic charge device 38, the induction charge device 40, the sensors 44, etc., as well as other sensors and/or electronic control units (ECUs) that provide data to the computer 10. Example output devices that may be actuated by the computer 10 include: the propulsion 26, the braking 28, the steering 30, the side view mirror 32, the navigation system 34, the transceiver 36, the photovoltaic charge device 38, the induction charge device 40, etc.

The processor 20 (and also processors of other computing devices referenced herein) is implemented via circuits, chips, or other electronic components and may include one or more microcontrollers, one or more field programmable gate arrays (FPGAs), one or more application specific circuits (ASICs), one or more digital signal processors (DSPs), one or more custom integrated circuits, etc. The processor 20 is programmable to process the data and communications received via the navigation system 34, the transceiver 36, the photovoltaic charge device 38, the induction charge device 40, the sensors 44, the memory 22, etc., as well as other sensors and/or electronic control units (ECUs) that provide data to the computer 10, e.g., on the communication network 46. Processing the data and communications may include processing to: navigate the vehicle 12 to a charge location based on a determination, upon determining that light received by the vehicle 12 is below a light threshold, that one of a current vehicle charge level and a predicted charge level is below a charge threshold. The processor 20 may further be programmed to perform the processes described herein.

The memory 22 (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 22 may store data collected from sensors 44 and programming for the computer 10, e.g., to perform the processes described herein.

The computer 10 is programmed to navigate the vehicle 12 to a charge location based on a determination that one of a current vehicle charge level when light received by the vehicle is below the light threshold and a predicted charge level when light received by the vehicle is below the light threshold is below a charge threshold.

The computer 10 may navigate the vehicle 12 by sending commands to the steering 30, braking 28, and propulsion 26 via the communication network 46 based information received from the navigation system 34 and sensors 44.

The charge location(s) may be stored in the navigation system 34, the computer 10 memory 22, and/or in the server computer 16. The charge locations may include a geographic location, e.g., latitude and longitude coordinates, and a type of the charge location, e.g., a photovoltaic charge location, an induction charge location, etc.

The computer 10 may be programmed to navigate to different types of charge locations based a comparison of the current vehicle charge level when light received by the vehicle is below the light threshold, and/or the predicted charge level when light received by the vehicle is below the light threshold, with a second charge threshold charge level, e.g., 75%. For example, the computer may navigate the vehicle 12 to the photovoltaic charge location when the predicted or current charge level is above the second charge threshold, and may navigate the vehicle 12 to the induction photovoltaic charge location when the predicted or current charge level is below the second charge threshold.

The photovoltaic charge locations provide light for conversion to electricity via the photovoltaic charge device 38. Example photovoltaic charge locations include parking lots and decks with overhead lighting, street side parking illuminated by a street light, etc.

The induction charge location provides an electromagnetic field for conversion to electricity via the induction charge device 40. For example, an inductive charging pad may be mounted on a parking spot. The inductive charging pad may draw electrical electricity from a power utility grid and convert the electricity to an alternating electromagnetic field via an inductive coil.

The current charge level may be identified by the computer 10 based on information from the voltage sensor 44 that detects the voltage of the battery 42, e.g., 100 volts. The computer 10 may identify the current charge level, e.g., 80%, with a lookup table or the like that correlates voltage with battery charge level, e.g., stored in the memory 22. The lookup table may further correlate the charge level, e.g., 80%, with an amount of electrical energy, e.g., 8 kilowatt-hours.

The predicted charge level when light received by the vehicle is below the light threshold can be based on the current charge level, a predicted charge rate, and an amount of time until sunset. For example, when the predicted charge rate is a constant value, the predicted charge level may be found by multiplying the predicted charge rate, e.g., 0.5 kilowatts, by the amount of time until sunset. e.g., 2 hours, and added to the amount of electrical energy, e.g., 8 kilowatt-hours, correlated with the current charge level, e.g., 80%, yielding a predicted amount of energy when light received by the vehicle is below the light threshold, e.g., 9 kilowatt-hours. The predicted amount of energy when light received by the vehicle is below the light threshold may be used with the lookup table to identify the predicted charge level when light received by the vehicle is below the light threshold, e.g., 90%. When the predicted charge rate is variable, multiplication may be replaced with a more advanced mathematical operation, such as integration. The predicted charge rate may be determined based on information such as weather data indicating potential cloud cover, a current time of day, a time of sunset, the current charge rate, historical charge rates, the vehicle 12 location, an amount of light received by the vehicle 12, etc., e.g., received from the server computer 16 and detected with sensors 44.

Light received by the vehicle may be identified as being below the light threshold when the current time is after sunset. After sunset, i.e., the time between when the sun sets and subsequently rises at a certain location, may be identified by the computer 10 based on information received by the computer 10 from the server computer 16, and/or from information stored in the memory 22. For example, a sunset information table correlating various locations, dates, and times of sunset and sunrise may be stored in the memory 22 and/or in the server computer 16. Based on a known location and date, the computer 10 may look up the after sunset time span in the sunset information table.

Identifying when light received by the vehicle is below the light threshold may be based on a measured brightness, e.g., based on information received by the computer 10 from sensors 44, e.g., a light sensor. The computer 10 may compare the measured brightness with the light threshold level. The threshold light level may be stored in the computer 10 when the vehicle 12 is manufactured. The threshold light level may be determined based on an amount of natural light typically available prior to sunset, and an amount of light typically available at a photovoltaic charge location, e.g., such that the light threshold is lower than the typically available amount of natural light and higher than the amount of light typically available at a photovoltaic charge location.

The charge threshold charge level, e.g., 80%, may be input to the computer 10 during manufacture of the vehicle, input by a user, e.g., via the user device 14, determined by the computer 10 based on historical charge data, predicted upcoming vehicle use, expected available light/weather conditions of a following day, a time remaining until sunrise, etc.

The computer 10 may be programmed to determine the photovoltaic charge location based on a photovoltaic charge location database. The photovoltaic charge location database includes information related to various photovoltaic charge locations, e.g., geographic location information, light operation information, e.g. between 7:00 pm and 5:00 am a light at a certain location will be in an "on" state, light intensity information, e.g., an amount of light, e.g., 40 lux, provided at the location, parking restriction information, e.g., a permit or payment required to park the vehicle 12 at the location, etc. The photovoltaic charge location database may be stored in the memory 22, the navigation system 34, the server computer 16, etc.

For example, the computer 10 may determine the photovoltaic charge location with the photovoltaic charge location database by identifying a photovoltaic charge location in the photovoltaic charge location database that meets various criteria, e.g., within a threshold distance, e.g., 4 miles, in an "on" state during a certain time period, e.g., from 11:00 pm to 3:00 am, providing a threshold amount of light, e.g. 30 lux, not having certain parking restrictions, e.g., not requiring a handicapped permit, etc. The criteria may be provided by a user, e.g., via the user device 14. The criteria may be determined by the computer 10, e.g., based on the battery charge level, an intended vehicle 12 use time (discussed below), etc.

The computer 10 can receive data from a vehicle 12 light sensor 44. The light sensor 44 measures the intensity of the light, e.g., 30 lux, and/or an amount of electricity that may be generated by the light, e.g. 150 volts. Example light sensors 44 include light meters, cameras, the photovoltaic charge device 38, etc. The information received from light sensor 44 may be used to measure and store the light information for later use and/or to identify a light source and navigate the vehicle 12 closer thereto.

The computer 10 may be programmed to measure the light intensity and/or amount of electricity that may be generated by light at a location with the light sensor 44, e.g., a light meter or the photovoltaic charge device 38. For example, when the vehicle 12 is in a parking lot when light received by the vehicle is below the light threshold, the vehicle 12 may add the location and the measured amount of light available to the photovoltaic charge location database, e.g., stored in the vehicle 12 computer 10 and/or the server computer 16, so that the vehicle 12 may return to such location at a later time to receive a charge. When the location and measured amount of light are added to the photovoltaic charge location database in the server computer 16 such information is available to other vehicles, thereby helping to crowd source the available data in the photovoltaic charge location database.

The computer 10 may be programmed to identify the light source with the light sensor 44, e.g., a camera, and navigate the vehicle 12 toward the light source to receive higher intensity light. For example, while parked at a photovoltaic charge location the vehicle 12 may identify a light source, and a direction to the light source, e.g., using the camera and known image processing techniques. As another example, the vehicle 12 may identify and navigate to a parking location closest to the light source, e.g., using the camera and known image processing techniques, such as when the vehicle 12 determines that available light is below a light threshold amount, e.g., when the vehicle 12 is in a parking structure that includes an artificial light source. The computer 10 may navigate the vehicle 12 towards the light source based on information from the camera and the navigation system 34, e.g., to ensure the vehicle 12 does not park in the middle of a road, etc.

The computer 10 may be programmed to determine the photovoltaic charge location based on information received from the smart light 48. The smart light 48 includes a computing device and a transceiver, i.e., hardware, e.g. circuits, chips, antenna, etc., programmed to actuate the smart light 48 between the "on" and "off" states, and to transmit status information about the smart light 48, e.g., a location of the smart light 48, when the smart light 48 is, or will be, in the "on" state, the amount of light generated by the smart light, e.g. 40,000 lumens, etc. The information about the smart light 48 may be transmitted via the network 18, e.g. to the vehicle 12 and/or the server computer 16 or via a short-range protocol such as Bluetooth.

For example, the computer 10 may receive information from the smart light 48, e.g., via the network 18, indicating that the smart light 48 is at a certain location and will be in the "on" state generating a certain amount of light at a certain time. The computer 10 may compare the information from the smart light 48 with threshold requirements, as discussed above for determining the photovoltaic charge location. When the information from the smart light 48 indicates that the smart light 48 meets the threshold requirements, and/or exceeds those of the photovoltaic charge locations in the photovoltaic charge location database, e.g., the smart light 48 is closer by a threshold distance (e.g., 1000 meters) than any charge location in the database, generates more light by a predetermined threshold, e.g., 40,000 lumens, etc., the vehicle 12 may determine the location of the smart light 48 as the photovoltaic charge location. Accordingly, the vehicle 12 may navigate to the location of the smart light 48.

The computer 10 may be programmed to determine the photovoltaic charge location based on an intended vehicle 12 use time, i.e., a predicted time of day at which a user intends to use the vehicle 12, e.g. 3:00 p.m. to 4:00 p.m. The intended vehicle 12 use time may be based on an input by the user, e.g., an input to the user device 14 indicating that the user is planning on leaving home to go to work at certain time. The intended vehicle 12 use time may be based on historical vehicle 12 use data, for example, the computer 10 may identify that every Thursday at 2:00 am the user uses the vehicle 12 to travel from a certain location, e.g., a local business, to go home. Based on the intended vehicle 12 use time, the computer 10 may determine the photovoltaic charge location, e.g., to maximize the charge received between the current time and the intended use time.

For example, the computer 10 may identify an amount of time until the intended vehicle use time, e.g., 2 hours. The vehicle 12 may determine the photovoltaic charge location based on the distance to the location and amount of light available at the location. For example, the vehicle 12 may determine to navigate to a closer location with less light intensity as compared to a further location with greater light intensity because of a difference in travel times, e.g., the vehicle 12 may determine that traveling for 15 minutes and charging for 1 hour and 45 minutes at the lower intensity light location will generate more electricity (and drain less battery) as compared to traveling for 30 minutes and charging for 1 hour and 30 minutes at the greater intensity light location.

The computer 10 may be programmed to navigate the vehicle 12 away from a photovoltaic charge location upon a determination that a cost of remaining at the photovoltaic charge location is greater than a benefit of remaining at the photovoltaic charge location. The cost of remaining at the photovoltaic charge location in this context is a monetary cost associated with the photovoltaic charge location. For example, the photovoltaic charge location may be a metered parking location requiring a payment authorization, e.g., from the computer 10 to the server computer 16 via the network 18. Such payment may be based on an amount of time spent at the location, e.g., $1.00 per hour to park. The benefit of remaining at the photovoltaic charge location is the electricity generated from the light received at the photovoltaic charge location, e.g., 0.5 kilowatts. The computer 10 may convert the generated electricity into a monetary equivalent for comparing to the cost of remaining at the photovoltaic charge location. For example, the vehicle 12 may identify the cost of acquiring electricity, e.g., $1.00 per kilowatt hour, at other charging locations, e.g., the induction charging location or plugging in the vehicle 12 at a user's home location. Accordingly, the computer 10 may determine that the cost, e.g. $2.00 to park for an hour, is greater than the benefit, e.g. $0.50 of electricity generated in an hour ($1.00 per kilowatt hour×1 hour×0.5 kilowatts). In response to such determination, the computer 10 may navigate the vehicle 12 away from the photovoltaic charge location.

The computer 10 may be programmed to actuate the vehicle 12 to provide a movement that can be sensed by a motion actuated light in response to determining the motion actuated light has turned off. For example, the computer 10 may identify that a light source has turned to an "off" state, e.g., based on information received from the light sensor 44, e.g., the light meter, camera, photovoltaic charge device 38, etc. In response to such identification, the computer 10 may actuate the vehicle 12 to provide a movement. For example, the computer 10 may actuate the side view mirror 32 to move between the extended and retracted positions. Additionally or alternately, the computer 10 may actuate the propulsion 26 to move the vehicle 12, e.g., 2 feet in a forward direction.

The computer 10 may be programmed to determine the induction charge location, e.g., based on an induction charge location database. The induction charge location database may include information related to various induction charge locations, e.g., a geographic location, e.g., latitude and longitude coordinates, an electricity cost, e.g., $1.00 per kilowatt hour, a charge rate, e.g., 100 kilowatts, etc. The induction charge location database may be stored in the memory 22 and/or the server computer 16.

The computer 10 may be programmed navigating the vehicle 12 to a home location in response to determining the current charge level is above another charge threshold, e.g., 95%, as discussed below for third and fourth charge threshold charge levels.

Process

Figure 2:
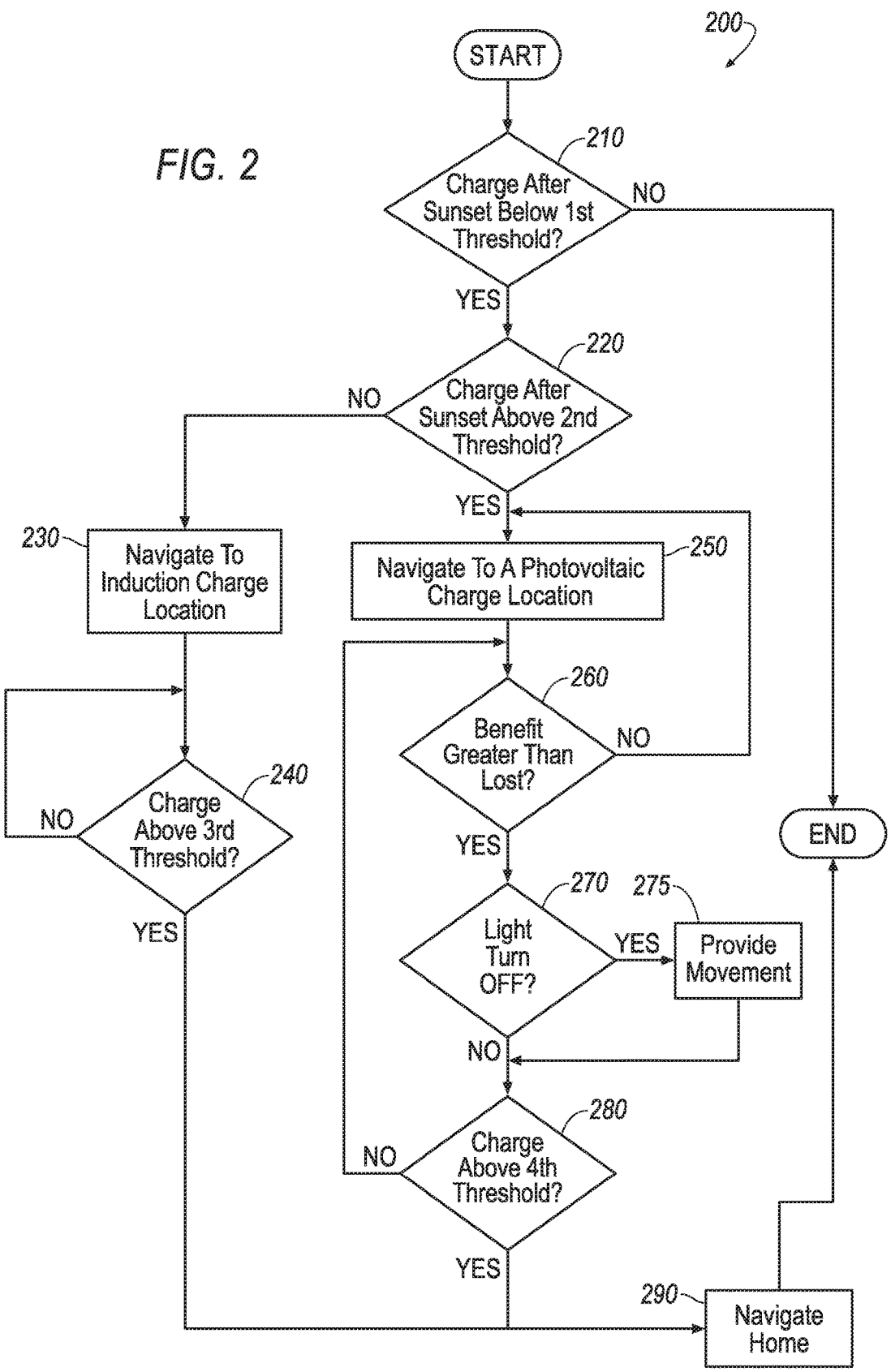
FIG. 2 illustrates a flow chart of an example process for charging with the example vehicle charging system of FIG. 1.

FIG. 2 is a process flow diagram illustrating an exemplary process 200 for controlling the autonomous rechargeable electric vehicle 12 to maximize the efficiency of charging at a time when sunlight is unavailable. The process 200 begins in a block 210 when the vehicle 12 is turned on or otherwise placed in a state of operability, at certain time of day, e.g., configured to bring the computer 10 to a wake state from a sleep state two hours before sunset, based on a measured brightness, e.g., when the computer 10 receives information from a light sensor 44 indicating brightness below a light threshold, e.g., 25 lux, such as when the setting sun and/or cloud cover reduce light received by the vehicle 12, when the vehicle 12 is prohibited from receiving natural light by a physical structure, e.g., an overhead ceiling of a parking garage, etc.

In the block 210 the computer 10 determines that the charge level of the battery 42 is, or will be, below a first charge threshold charge level, e.g., 95%, when light received by the vehicle is below the light threshold. Upon determination that the charge level is, or will be, below the first charge threshold, the process 200 moves to a block 220. Upon determination that the charge level is not, or will not be, below the first charge threshold, the process ends. Alternatively, the process could remain at the block 210 to monitor whether the charge level of the battery 42 falls below the first charge threshold charge level.

In the block 220 the computer 10 determines that the charge level of the battery 42 is, or will be, above a second charge threshold charge level, e.g., 80%, when light received by the vehicle is below the light threshold. Upon determination that the charge level is not, or will not be, above the second charge threshold, the process 200 moves to a block 230. Upon determination that the charge level is, or will be, above the first charge threshold, the process 200 moves to a block 250. The second charge threshold charge level may be determined based on an expected charge that may be received at the photovoltaic charge location. The induction charge locations typically provide more power than the photovoltaic charge locations when light received by the vehicle is below the light threshold. Accordingly, the second charge threshold may be targeted relative to the amount of power available at the photovoltaic charge location, e.g., to determine whether the photovoltaic charge location will be sufficient or whether induction of plug in charging will be necessary.

In the block 230 the computer 10 navigates to the vehicle 12 to the induction charge location and receives a charge. For example, the computer 10 determines the induction charge location based on the induction charge location database, navigates the vehicle 12 to the induction charge location based on information received from the navigation system 34 and sensors 44, and receives the charge via the induction charge device 40.

Next at a block 240 the computer 10 determines that the charge level of the battery 42 is above a third charge threshold charge level, e.g., 95%. Upon determination that the charge level is above the third charge threshold, the process 200 moves to a block 290. Upon determination that the charge level not is above the third charge threshold, the vehicle 12 remains at the induction charge location receiving the charge, with the block 240 repeated at time intervals, e.g., every 2 minutes.

At the block 250 the computer 10 navigates the vehicle 12 to the photovoltaic charge location and receives a charge. For example, the computer 10 determines the photovoltaic charge location, navigates to the photovoltaic charge location based on information received from the navigation system 34, and receives a charge via the photovoltaic charge device 38. Additionally or alternatively the computer 10 may identify the light source providing the photovoltaic charge and a direction towards the light source relative the vehicle 12 and/or a parking location closest to the light source, e.g., based on information received from the camera. The computer 10 may then navigate the vehicle 10 towards the identified light source and/or to the parking location, e.g., by actuating the propulsion 26, braking 28, and steering 30 based on information received from the sensors 44 and the navigation system 34.

Next, at a block 260 the computer 10 determines whether the cost of remaining at the photovoltaic charge location is greater than the benefit of remaining at the photovoltaic charge location. Upon determination that the cost is greater than the benefit, the process 200 returns to the block 250 to navigate the vehicle 12 to a different photovoltaic charge location. Upon determination that the cost is not greater than the benefit, the vehicle 12 remains at the photovoltaic charge location receiving the charge.

Next, at a block 270 the computer 10 determines whether the light at the photovoltaic charge location has turned off, e.g., based on information from the light sensor 44. Upon determination that the light has turned off, the process advances to a block 275. Upon determination that the light has not turned off, the process advances to a block 280.

At the block 275 the computer 10 actuates the vehicle 12 to provide a sensed movement. For example, the computer 10 may actuate the propulsion 26 and/or the side mirror 32.

At the block 280 the computer 10 determines that the charge level of the battery 42 is above a fourth charge threshold charge level, e.g., 95%. Upon determination that the charge level is above the fourth charge threshold, the process 200 moves to a block 280. Upon determination that the charge level not is above the fourth charge threshold, the vehicle 12 remains at the photovoltaic charge location receiving the charge, with the block 260, block 270, and block 280 repeated at time intervals, e.g., every 2 minutes.

At the block 290 the computer 10 navigates the vehicle 12 to a home location. After the block 280 the process 200 ends.

CONCLUSION

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising, a computer programmed to:
   navigate a vehicle to a charge location upon determining that light received by a vehicle sensor is below a light threshold, and that a current vehicle charge level or a predicted charge level is below a charge threshold;
   wherein the charge location is selected from a photovoltaic charge location and an induction charge location by comparing the predicted or current charge level to a second charge threshold.

2. The system of claim 1, wherein the computer is further programmed to navigate the vehicle away from a photovoltaic charge location upon a determination that a cost of remaining at the photovoltaic charge location is greater than a benefit of remaining at the photovoltaic charge location.

3. The system of claim 1, wherein the photovoltaic charge location is selected when the predicted or current charge level is above the second charge threshold.

4. The system of claim 1, the computer further programmed to determine the photovoltaic charge location based on a time at which the vehicle is intended to be operated.

5. The system of claim 1, the computer further programmed to determine the photovoltaic charge location based on information received from a light sensor.

6. The system of claim 1, the computer further programmed to determine the predicted charge level based on the current charge level, a predicted charge rate, and an amount of time until sunset.

7. The system of claim 1, the computer further programmed to determine the photovoltaic charge location based on information received from a smart light.

8. The system of claim 1, the computer further programmed to actuate the vehicle to provide a movement that can be sensed by a motion-actuated light in response to determining the motion-actuated light has turned off.

9. The system of claim 1, wherein the light received by the vehicle is identified as being below the light threshold when the current time is after sunset.

10. The system of claim 1, wherein the induction charge location is selected when the predicted or current charge level is not above the second charge threshold.

11. A method comprising:
    navigating a vehicle to a charge location upon determining that light received by a vehicle sensor is below a light threshold, and that a current vehicle charge level or a predicted charge level is below a charge threshold;
    wherein the charge location is selected from a photovoltaic charge location and an induction charge location by comparing the predicted or current charge level to a second charge threshold.

12. The method of claim 11, further comprising navigating the vehicle away from a photovoltaic charge location upon a determination that a cost of remaining at the photovoltaic charge location is greater than a benefit of remaining at the photovoltaic charge location.

13. The method of claim 11, wherein the photovoltaic charge location is selected when the predicted or current charge level is above the second charge threshold, and the induction charge location is selected when the predicted or current charge level is not above the second charge threshold.

14. The method of claim 11, further comprising determining the photovoltaic charge location based on a time at which the vehicle is intended to be operated.

15. The method of claim 11, further comprising determining the photovoltaic charge location based on information received from a light sensor.

16. The method of claim 11, further comprising determining the photovoltaic charge location based on information received from a smart light.

17. The method of claim 11, further comprising determining the predicted charge level based on the current charge level, a predicted charge rate, and an amount of time until sunset.

18. The method of claim 11, further comprising actuating the vehicle to provide a movement that can be sensed by a motion-actuated light in response to determining the motion-actuated light has turned off.

19. The method of claim 11, wherein the light received by the vehicle is identified as being below the light threshold when the current time is after sunset.

* * * * *